Figure 1:
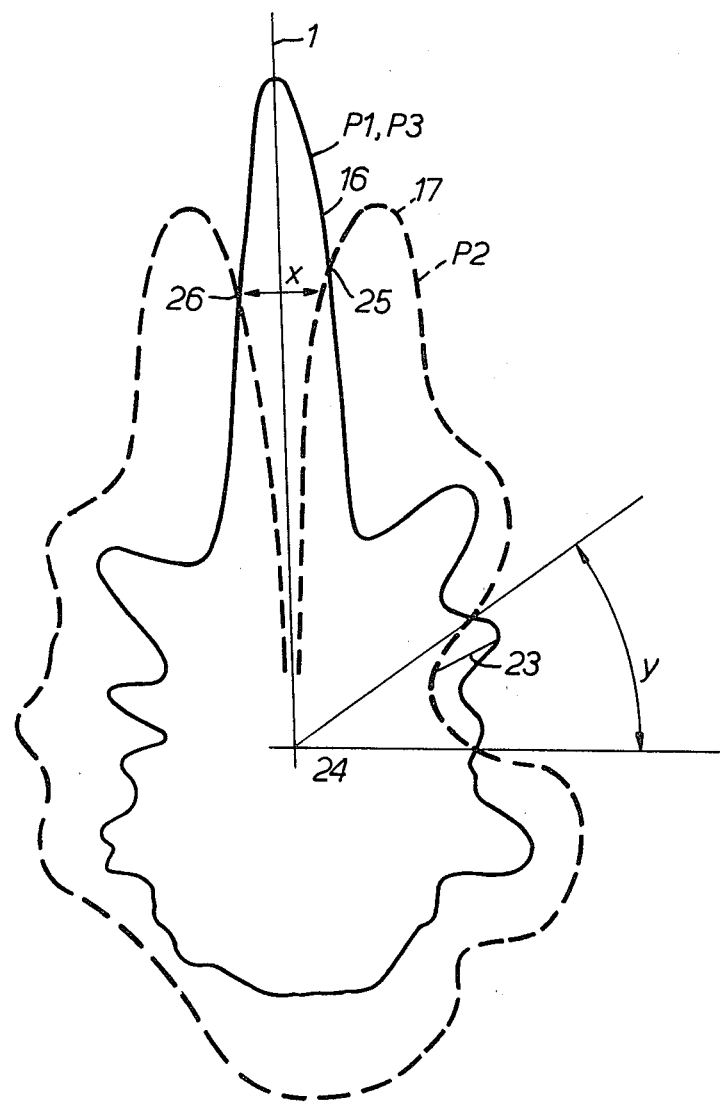

United States Patent [19]
Gordon

[11] 4,334,224
[45] Jun. 8, 1982

[54] SECONDARY SURVEILLANCE RADAR

[75] Inventor: John F. Gordon, Black Notley, England

[73] Assignee: The Marconi Company Limited, Chelmsford, England

[21] Appl. No.: 173,910

[22] Filed: Jul. 30, 1980

[30] Foreign Application Priority Data

Aug. 23, 1979 [GB] United Kingdom ............. 7929452

[51] Int. Cl.³ .................... G01S 13/78; G01S 13/44
[52] U.S. Cl. ............................. 343/6.5 R; 343/16 M
[58] Field of Search ...................... 343/6.5 R, 16 M

[56] References Cited

U.S. PATENT DOCUMENTS

| | | | |
|---|---|---|---|
| 3,283,322 | 11/1966 | Hovda et al. | 343/16 M |
| 3,349,402 | 10/1967 | Foster | 343/6.5 R X |
| 3,427,621 | 2/1969 | Brunner | 343/6.5 R X |
| 4,100,544 | 7/1978 | Keeran | 343/6.5 R |

FOREIGN PATENT DOCUMENTS 1316562  5/1973  United Kingdom ............ 343/6.5 R

Primary Examiner—T. H. Tubbesing
Attorney, Agent, or Firm—Spencer & Kaye

[57] ABSTRACT

A secondary surveillance radar is arranged to monitor the relative amplitudes of sum signals and difference signals received from a target in response to interrogations. Only those replies for which the sum signal exceeds the difference signal by a predetermined amplitude are accepted as valid to avoid degradation of the performance of the radar due to "punch through". "Punch through" stems from distortions in the radiation pattern of the radar and is often caused by reflections of the radar signals by large objects. A directional receiving antenna generates sum ($\Sigma$) and difference ($\Delta$) signals, and replies are accepted as valid and gated to an output only if a quantity log $\Delta/\Sigma$ exceeds a reference when compared at a comparator.

6 Claims, 3 Drawing Figures

SECONDARY SURVEILLANCE RADAR

This invention relates to secondary surveillance radar (SSR) using monopulse direction finding in which pulses transmitted by a base radar station are used to interrogate a target which in turn sends a reply to the base station if it is able and willing to respond to the interrogation pulses. Radar systems of this kind are also sometimes referred to as radar beacon systems (RBS) and they are usually used by base stations on the ground to monitor the movement of aircraft in the vicinity of an airport. The transmitted interrogation pulses trigger the operation of an automatic responder carried by the aircraft which intercept the pulses. When a reply is received at the ground station the range of the aircraft can be deduced from the delay occurring between the transmission of the interrogation pulse and the receipt of the reply. The boresight continually rotates in azimuth and in order to improve the directional nature of the interrogation, the interrogation pulses consist of a sequence of three separate pulses designated P1, P2 and P3 by international convention and ideally the magnitudes of pulses P1 and P3 exceed that of pulse P2 only in the direction of the radar boresight. The transponders carried by aircraft are arranged to respond to the interrogation pulse only when this condition is satisfied, and to suppress any reply when the pulse P2 is of greater magnitude than pulses P1 and P3. Thus when a reply is received by the ground station, the direction of the responding aircraft can be determined.

The operation of a secondary surveillance radar can be seriously affected by reflections of interrogation pulses and/or the reply pulse by large objects such as aircraft hangers and other buildings close to the radar transmitter. In some circumstances this can adversely affect the reliability and integrity of the information provided by a secondary surveillance radar since the magnitudes of pulses P1 and P3 may exceed that of pulse P2 in directions off boresight.

The present invention seeks to reduce this difficulty.

According to this invention a secondary surveillance radar includes a directional antenna capable of being operated in sum and difference modes and which is arranged to receive replies from targets in response to transmitted interrogations; means for deriving a sum signal and a difference signal from a received reply and for inhibiting the reply unless the amplitude of the sum signal exceeds that of the difference signal by more than a predetermined amount, it being understood that this predetermined amount is a value other than zero.

The predetermined amount may be adjustable or variable.

It has been found that the integrity of operation of a secondary surveillance radar can be impaired by an effect sometimes termed "punch through". The correct operation of a secondary surveillance radar assumes that for all directions of azimuth other than a small angle centred on the boresight of the radar antenna, the amplitude of pulses P1 and P3 is less than the amplitude of pulse P2, but the sensitivity pattern of directional antennas is not perfect and it includes sidelobes which depend on the design of the antenna and the nature of the location in which it is situated.

Additionally the presence of large buildings such as aircraft hangers near the radar transmitter can cause the interrogation pulses to be reflected in directions away from the boresight of the radar.

Preferably the sum and difference signals are each passed through a logarithmic amplifier prior to comparison. Preferably again after the sum and difference signals have been passed through the logarithmic amplifier one signal is subtracted from the other signal and the result of the subtraction is compared with a reference value.

If the result of the comparison produces a signal having a very low amplitude, its integrity is suspect and the associated reply is discarded.

Preferably again the sum signal is passed to an output terminal via a gate which is controlled in dependence on the result of said comparison so that only valid replies are allowed to pass.

Because the subtraction and comparison process require some time to operate, preferably the sum signal is delayed prior to its application to said gate so that it is in synchronism with a gate control signal, which was derived from it.

Figure 2:
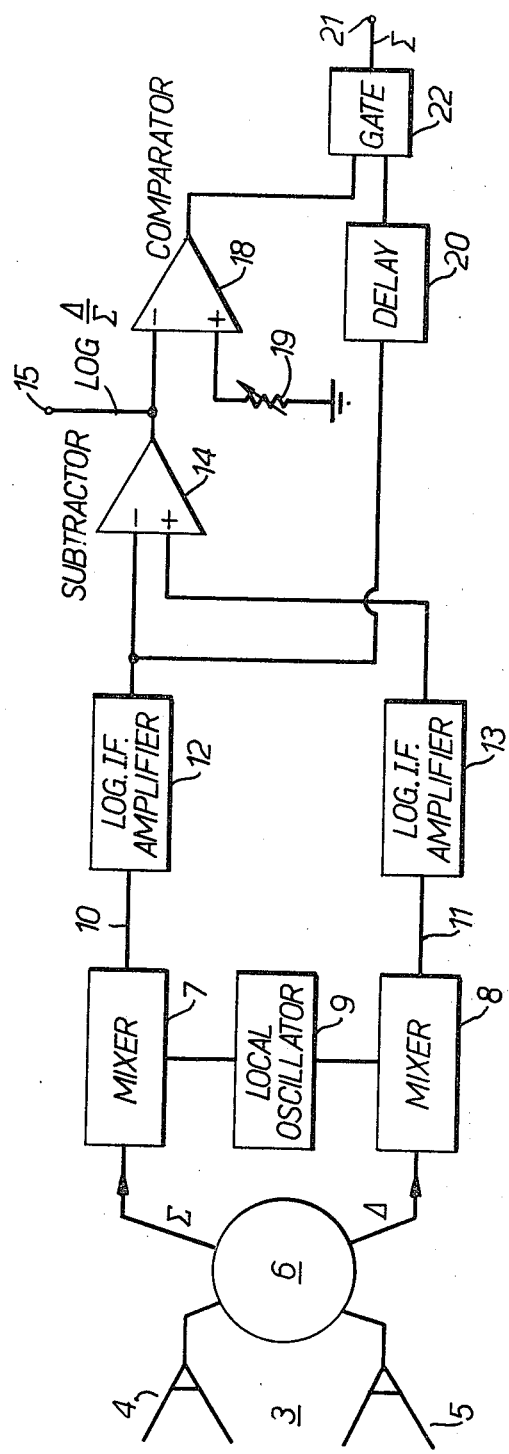
Figure 3:
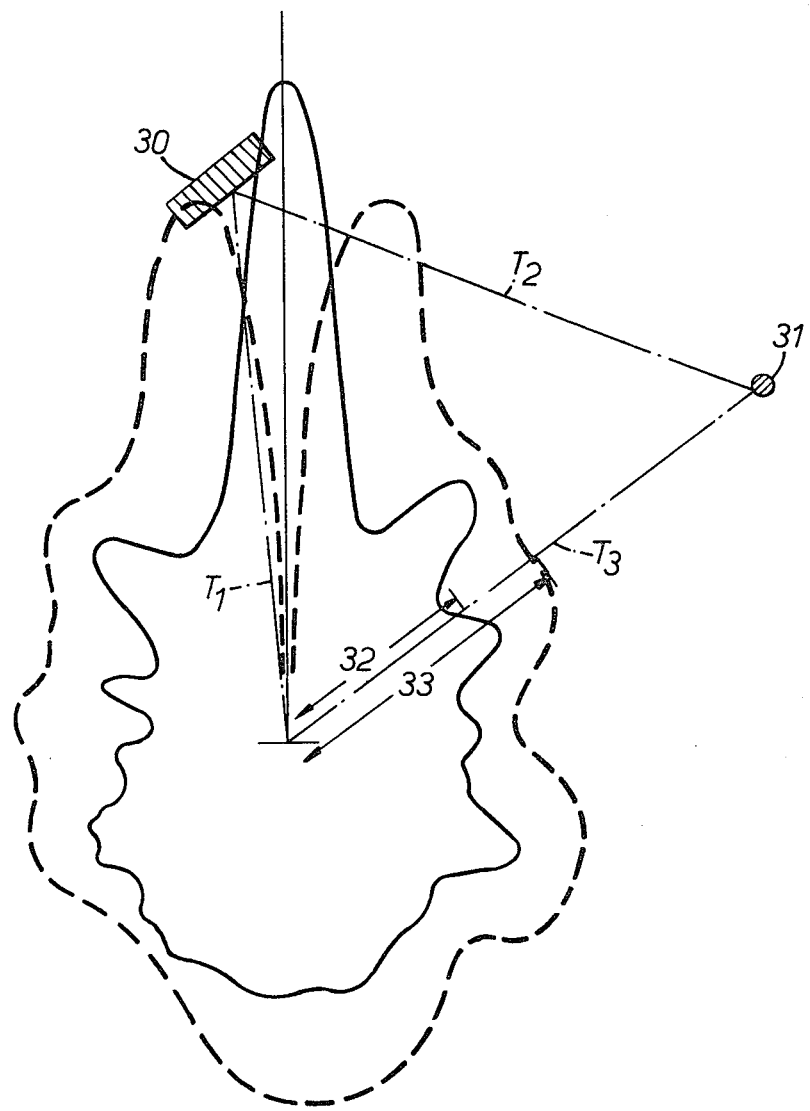

The invention is further described by way of example with reference to the accompanying drawing in which, FIG. 1 illustrates a typical sensitivity pattern for a secondary surveillance radar, FIG. 2 illustrates part of a secondary surveillance radar in accordance with the present invention and FIG. 3 is a further explanatory diagram.

A secondary surveillance radar transmits a sequence of three interrogation pulses termed P1, P2 and P3. The time interval between pulses P1 and P3 determines the nature of the interrogation being made, i.e. by choosing the appropriate spacing an aircraft can be asked to provide its identity or its altitude, for example. The pulse P2 is used as a control pulse and by convention P2 is spaced apart from P1 by two microseconds. The interrogation pulses P1 and P3 are generally transmitted by an antenna having a radiation pattern which is extremely narrow in azimuth, so that only those aircraft lying in a very small angle of azimuth are interrogated. In this way the angular position of aircraft can be determined. However, radiation patterns which are very narrow in azimuth inevitably produce sidelobes which in some cases can be of sufficient signal strength to stimulate replies from aircraft at relatively short range from the radar station, but which are not in the direction of the radar boresight. For this reason, the control pulse P2 is used and the transponders carried by the aircraft are arranged to reply only if the control pulse P2 is of lower amplitude than the pulses P1 and P3. When the control pulse P2 is of an amplitude greater than that of pulses P1 and P3, the transponder is suppressed and no reply is sent. By transmitting the pulse P2 as a difference pattern from a directional antenna, a sharp minima is produced on the boresight of the radar.

In FIG. 1, the amplitude distribution of pulses P1 and P3 is shown in solid line 16 and that of pulse P2 is shown in broken line 17. The boresight of the radar is represented by the line 1 and it will be seen that the amplitudes of P1 and P3 exceed that of P2 for a small angle X, which is centered on the boresight 1. Thus aircraft only receiving the interrogation pulses within this small angle X, will reply. This ideal mode of operation does not always occur due to the effect sometimes referred to as "punch through". In FIG. 1, "punch through" occurs over the angle Y in which the amplitude of the pulse P2 is locally reduced at angles away from the boresight 1, so that it is of a lower amplitude than the pulses P1 and P3. "Punch through" can occur primarily due to the presence of large buildings which can cause unwanted reflections. Commonly secondary surveillance radars are located on or very close to an airfield and the presence of large aircraft hangar can be a particularly serious source of reflections. An aircraft located in the angle Y will receive a correct interrogation signal and will thus automatically respond by sending the appropriate reply.

Although FIG. 1 indicates the transmission pattern of a secondary radar, its reception pattern is very similar. In order to obtain the correct amplitude profiles close to boresight, it is usual for pulses P1 and P3 to be transmitted by a directional antenna operating in the sum mode and for pulse P2 to be transmitted by the same antenna operating in the difference mode. In order to reduce the likelihood of "punch through" occurring due to excessive sidelobes, which stem from the design of the directional antenna itself, it is possible to also radiate the pulse P2 from an omni-directional antenna so as to increase its amplitude in directions away from the boresight of the radar.

If the diagram shown in FIG. 1 is now regarded as a reception sensitivity pattern, it will be seen that for aircraft on or very near to the boresight 1, the amplitude of a signal received by the antenna in the sum mode is very much greater than that of the signal received in the difference mode. The actual difference in the amplitudes is a function of the angular deviation of the target from the boresight and by carefully comparing the amplitudes of the two signals, the actual direction of a target can be calculated. It has been found that the difference between the sum and difference signals received from an aircraft located in the angle Y is relatively small and this property can be used to eliminate replies from aircraft in this region.

FIG. 2 illustrates part of a radar in which replies caused by "punch through" are discarded. A directional antenna 3 is arranged so that it is capable of operating in the sum and difference modes. For this reason, it is illustrated as being in two parts 4 and 5. In order to derive a difference signal, the echoes received by the antenna elements 4 and 5 are combined in anti-phase, whereas to obtain a sum signal they are combined exactly in phase. This combination is achieved in a combiner network 6, which has two outputs designated Σ and Δ as shown. The Σ output represents the sum signal and the Δ output represents the difference signal. These two signals are applied to respective mixers 7 and 8 where they are mixed with a frequency from a local oscillator 9 to produce respective intermediate frequency signals on lines 10 and 11. These intermediate signals are fed through logarithmic amplifiers 12 and 13 and are applied to the inputs of a subtractor circuit 14. In the drawing, the sum signal is applied to the negative input terminal of the subtractor, whereas the difference signal is applied to the positive input. The result of the subtraction is to produce a signal having an amplitude of log Δ/Σ.

As indicated previously, the value of Δ/Σ is indicative of the angular deviation of the target from the boresight 1. The signal from the subtractor 14 is applied via a terminal 15 to a processor (not shown) which calculates this angular deviation based on a knowledge of the curves 16 and 17 in the region of the angle X shown in FIG. 1.

This signal log Δ/Σ is applied to one input of a comparator 18, where it is compared with a reference potential derived from an adjustable voltage source represented by variable resistor 19. If the signal is above the reference potential, the comparator 18 generates a control signal which opens a gate 22. The sum signal is fed from the output of the amplifier 12 via a delay network 20 to the gate 22. The gate 22 is an AND gate, so that only when the comparator 18 provides an appropriate control signal is the sum signal passed to an output terminal 21. The subtractor 14 and the comparator 18 require a short but finite time to operate, and the period of the delay network 20 is chosen so as to be equal to this time. Thus the sum signal is applied to the gate 22 in synchronism with the corresponding control signal produced by the comparator 18.

The value of the reference potential which is determined by the variable resistor 19 is set so as to exclude all signals which could be obtained from aircraft lying in an angle such as angle Y where "punch through" can occur. The maximum difference which can occur between the sum and difference signals for a target located in the angle Y is indicated by the line 23. The line 23 passes through the origin 24 of the pattern shown in FIG. 1 and represents the maximum radial divergence of the lines 16 and 17.

An incidental effect of providing the threshold voltage is to reduce slightly the effective angle X over which valid replies can be received from a target close to the boresight 1, but since the lines 16 and 17 diverge sharply from each other at the crossing points 25 and 26, the reduction in the size of the angle X is very small and in practice, is quite acceptable.

It will be understood that only those portions of the radar relevant to an understanding of the invention are shown in FIG. 2. In practice of course, the radar also includes those parts which are necessary for the transmission of radar interrogation pulses, and the processing of the replies received from targets which respond to the interrogation.

The invention also enables replies to be suppressed which are caused by undesirable reflections. FIG. 3 illustrates a diagram which is generally similar to FIG. 1, but for which the amplitude profile of pulse P2 is greater than that of pulses P1 and P3, except for the small angle X centred on boresight. However a large building 30, such as an aircraft hanger, is located such as to reflect the pulses P1, P2 and P3 to a target 31. The transit time for the pulses to reach the target via the reflector is T1+T2 and the transit time for the reply to be sent direct from the target to the radar is T3, giving a round trip time of T1+T2+T3. This time is processed to give an apparent range for the target on the assumption that it lies in the direction of the building 30. The present invention enables replies of this kind to be rejected since it will be seen that the received sum signal Σ (which has an amplitude represented by the amount 32) is less than the amplitude of the difference signal Δ (represented by the amount 33). Since the comparator rejects all replies for which the amplitude of the difference signal Δ exceeds that of the sum signal Σ by more than the reference value, all replies due to the reflections under these circumstances will not be passed by the gate 22.

I claim:

1. A secondary surveillance radar including a directional antenna capable of being operated in sum and difference modes and which is arranged to receive replies from targets in response to transmitted interrogations; and circuit means connected to said antenna for deriving a sum signal and a difference signal from a received reply and for inhibiting the reply unless the amplitude of the sum signal exceeds that of the difference signal by more than a predetermined amount other than zero.

2. A radar as claimed in claim 1, wherein said circuit means include logarithmic amplifier means for amplifying each of the sum and difference signals prior to comparison.

3. A radar as claimed in claim 2, wherein said circuit means further comprise subtracting means connected to said logarithmic amplifier means for subtracting one signal from the other signal after the sum and difference signals have been passed through said logarithmic amplifier means, and comparison means connected to said subtracting means for comparing the result of the subtraction with a reference value.

4. A radar as claimed in claim 3, wherein said circuit means further comprise means for passing the sum signal to an output terminal via a gate which is controlled in dependence on the result of said comparison so that only those replies for which the sum signal exceeds the difference signal by a predetermined amount are allowed to pass through the gate.

5. A radar as claimed in claim 4, wherein said circuit means further comprise delay means connected ahead of said gate for delaying the sum signal prior to its application to said gate so that the sum signal is in synchronism with a gate control signal, which was derived from it.

6. A radar as claimed in claim 3, wherein said comparison means include means for producing said reference value, said reference value producing means being adjustable so as to allow the reference value to be varied.

* * * * *